United States Patent Office 3,565,861
Patented Feb. 23, 1971

3,565,861
AMINE COMPLEXES OF PF$_5$, AsF$_5$, AND SbF$_5$ AS LATENT CURING AGENTS FOR EPOXY RESINS
Wayne E. White, Tulsa, Okla., and Leslie C. Case, Winchester, Mass., assignors to Ozark-Mahoning Company, Tulsa, Okla., a corporation of Delaware
No Drawing. Continuation-in-part of application Ser. No. 504,989, Oct. 24, 1965. This application Apr. 30, 1969, Ser. No. 820,656
Int. Cl. C08g 30/14
U.S. Cl. 260—47          2 Claims

ABSTRACT OF THE DISCLOSURE

A latently curable composition and process for curing same to a cross-linked ethoxyline composition. The latently curable composition consisting of a complex of phosphorous pentafluoride, arsenic pentafluoride, or antimony pentafluoride with a primary acylic aliphatic amine having from one to eighteen carbon atoms and a glycidyl ether polyepoxide or a 1,2-epoxy-substituted cycloaliphatic polyepoxide. The process including polymerizing the latently curable composition with the addition of heat to form a cured, cross-linked ethoxyline composition.

---

This application is a continuation-in-part of our application Ser. No. 504,989, filed Oct. 24, 1965, for "Latent Curing Agents for Epoxy Resins," now abandoned.

A large body of art relates to the curing of epoxy resins and other polyepoxides to ethoxyline compositions. One of the particular areas of interest in this art is the incorporation of a curing agent and the epoxy resin into a storable, stable, fluid, one-package system which can be subsequently cured to a cross-linked composition by the application of heat. To date, no really satisfactory such system has been available.

The complex of boron trifluoride and ethylamine (known in the trade as BF$_3$–400) is frequently used in this application, but suffers from several prominent disadvantages: (1) the systems prepared by dissolving BF$_3$–400 in epoxy resins are not viscosity-stable but increase to unusable viscosities in the space of a few weeks; (2) the BF$_3$–400 is a very active curing agent, and must be used with considerable care to avoid vigorous exotherming, darkening, and degradation; (3) even when used with care, BF$_3$–400 often gives a cured composition having a wrinkled surface which is generally undesirable.

Recently the pentafluorides of three of the Group V–A elements—phosphorus, arsenic, and antimony—have become available and have been found to have Lewis acid characteristics, i.e., they form complexes with basic amines such as ethylamine. Examples of the complexes are ethylamine-PF$_5$, propylamine-AsF$_5$ and benzylamine-SbF$_5$. In these complexes the usual molecular ratio of amine (or base): pentafluoride (or acid) is 1:1.

DESCRIPTION OF THE INVENTION

We have discovered that the adducts formed between these new Lewis acids and certain classes of amines function as curing agents for epoxy resins and that they have advantages over the presently known BF$_3$–400 type of greater latency without loss of desired activity at elevated temperatures. Furthermore, these new agents appear to be superior to the presently used complexes in respect to quality of resin obtained and in greater flexibility in processing.

Reference is made to "Chemistry of Phosphorus Fluorides" by Muetterties, E. L., et al., J. Inorg. Nucl. Chem., vol. 16, pp. 52–59 (1960); "Advances in Inorganic Chemistry and Radio Chemistry," vol. 7, page 6, Kolditz, L., Academic Press (1965) (chapter entitled "Halides of Phosphorus, Arsenic, Antimony, and Bismuth"); Johnson, S., Purdue University Ph.D. Thesis, June 1953 and Woolf, J. Inorg. and Nucl. Chem., 3,285, 1956. Further, "Addition Compounds of Group V Pentahalides," Chemical Review, vol. 66, pages 87–118 (1966), Webster, M.

AMINE CHARACTER (1) We have discovered that for optimum curing action the amine with which the phosphorus-group pentafluoride is complexed must have at least one unsubstituted —NH$_2$ type amine. It is thought that this may be due to the necessity of providing more than one amine active hydrogen in order to obtain cross-linking.

(2) We have also found that amines in which the —NH$_2$ group is attached directly to an unsubstituted aromatic ring form complexes which function as rapid curing agents but are not sufficiently stable to have the desired inactivity at ordinary temperatures, i.e., they are not latent. Therefore, the amines having —NH$_2$ attached to aliphatic carbon form the most desirable complexes.

(3) Generally, the amines having from 1 to 18 carbon atoms from satisfactory complexes. The hydrocarbon group attached to the —NH$_2$ substituent may be saturated, or partially unsaturated, and may be substituted by various substituent groups, such as ether radicals. Also, there may be substitution by an aromatic ring. The hydrocarbon residue of the amine may be a straight chain or it may be branched. The amine also may have more than one amine nitrogen.

Some typical suitable amines include: methylamine, ethylamine, propylamine, isopropylamine, butylamine, isobutylamine, t-butylamine, hexylamine, isohexylamine, laurylamine, stearylamine, methane diamine, alpha-phenylethylamine, beta-phenylethylamine, benzylamine, and gamma-ethoxypropylamine.

Particularly satisfactory complexes are formed from ethylamine, isopropylamine, butylamine, laurylamine, and benzylamine. Generally, the PF$_5$ complexes are the most stable, so that PF$_5$-isopropylamine and PF$_5$-benzylamine are particularly desirable curing agents. The PF$_5$ complexes also seem to be more soluble than the AsF$_5$ and SbF$_5$ complexes.

POLYEPOXIDE CHARACTER

The complexes of this invention may be used to cure various polyepoxides to form cross-linked, infusible resins. The various types of phenolic-glycidyl ether epoxy resins are particularly suitable. Thus, the epoxy resins prepared from the condensation of epichlorohydrin and Bisphenol A, and having a molecular weight of from about 350 up to more than 5000, may be cured by the use of the complexes of this invention. The epoxy resins prepared by the reaction of epichlorohydrin with resins of the phenol-formaldehyde type are also satisfactorily cross-linked by the complexes of this invention. Various aliphatic glycidyl ethers, such as glycerol poly(glycidyl) ether having at least 2 epoxy groups are also cross-linked by the action of the complexes of this invention. Aliphatic polyepoxides prepared by the epoxidation of polyolefins are also rapidly cross-linked by the complexes described herein. For example, vinylcyclohexene diepoxide, 3,4-epoxy-6-methylcyclohexylmethyl-3',4'-epoxy - 6' - methylcyclohexanecarboxylate, and bis-(2,3-epoxycyclopentyl) readily react with the complexes of this invention. These aliphatic epoxides containing at least one epoxy group attached to a cycloaliphatic ring of 5 or 6 carbon atoms are generally reactive. And the corresponding aliphatic epoxides containing 2 epoxy groups attached to a cycloaliphatic ring of 5 or 6 carbon atoms are particularly reactive.

CHARACTER OF CURING REACTION

The amine complexes of this invention are generally satisfactory curing agents for all epoxy resins which can be cured to a cross-linked infusible resin using a strong Lewis acid, such as $BF_3$ or $PF_5$. Thus, if $PF_5$ or $BF_3$, or the etherate of either, is blended with the epoxy resin and there results a rapid exothermic reaction which yields a cross-linked resin, then the amine complexes of this invention will be satisfactory curing agents for the same epoxy resin.

Other reactants may sometimes be advantageously employed along with the polyepoxide and the amine complex curing agent although they are not essential. An anhydride of an organic polycarboxylic acid may be employed as a coreactant along with the intimate admixture of polyepoxide and complex curing agent. A cross-linked resin having ester as well as ether linkages would thus be prepared. Alternatively, an alcohol, phenol, or polyol may be employed as a coreactant. The use of such coreactants in epoxy resin chemistry is well known to the art.

The amount of amine complex used depends on the equivalent weight of the polyepoxide, the equivalent weight of the amine complex, and the reactivity of the epoxy resin with the complex. Generally, the amine complex constitutes from about 0.2% up to more than 20% by weight of the resin-complex admixture. Frequently, this proportion is in a range of from about 1% up to 10% of the total weight of the admixture, and about 3% to 5% by weight is perhaps the most useful range. With low-molecular-weight epoxy resins, and amine complexes having equivalent weights of about 300 or greater, the amount of curing agent used is generally about 5–10% by weight. On the other hand, with high-molecular-weight epoxy resins, particularly with very low-equivalent-weight or very active amine complexes, about 0.5%–1.0% by weight of complex is sufficient to cause good cure.

If cyclic anhydrides are employed in the reaction mixture, from about 0.3 up to 1.0 moles of

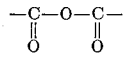

group per mole of epoxide ring groups are usually employed, although this ratio may be as low as 0.1 mole per mole in order to achieve only moderate modification of the properties of the cured epoxy resin system.

If phenols, alcohol, or polyols are used as coreactants in the reaction mixture, from about 0.05 up to 0.5 equivalent of hydroxy group per mole of epoxide ring are usually employed.

CURE PROCESS

To effect cure, the intimate admixture of epoxy resin and complex curing agent is heated at an elevated temperature for a time sufficient to effect cure to the desired insoluble, infusible resin. The temperature used in the curing of the epoxy resin-amine complex system depends on the reactivity of the system, and generally varies from about 80° C. up to more than 250° C., with a range of about 100° C. up to 180° C. being frequently useful. A temperature of about 130° C. up to 150° C. is perhaps most generally useful.

The time required for achievement of a good cure depends not only on the activity of the epoxy resin-amine complex system but also on the temperature used in the cure. Generally, the time required varies from about 1 minute at the highest curing temperature, to about 24 hours or more at 100° C.

In general, it may be desirable to execute the cure in a closed system, to avoid loss of volatile components, and it may even be effected at elevated pressures. However, the cure may be conducted in a vessel or system open to the atmosphere, especially when the mixture being cured is present in massive amounts.

The cured ethoxyline compositions prepared by the process of the present invention are useful as potting compounds, adhesives, components of laminated structures, and coatings.

EXAMPLES AND METHODS

The following examples and methods of preparation serve to illustrate the characteristics of the new complexes [but in no way are they intended to limit the scope of the present invention].

For the sake of brevity in the following examples, reference is made to various trademarks to identify the polyepoxide resin used. A precise definition of these resins is found in the following references.

Epon 812 is a liquid glycerol polyglycidyl ether resin marketed by Shell Chemical Company and is characteristically described by: 3 max. Gardener color, 1.0 to 1.7 poises viscosity at 25° C., and 140 to 160 epoxy equivalent weight. Modern Plastics Encyclopedia, 1965, vol. 42, No. 1a, p. 206, New York, N.Y., McGraw-Hill, Inc. (September 1964).

Epon 826 is a liquid bisphenol A-diglycidyl ether resin marketed by Shell Chemical Company and described by: 2 max. Gardener color, 65 to 95 poises viscosity at 25° C., and 180 to 188 epoxy equivalent weight. Modern Plastics Encyclopedia, 1965, vol. 42, No. 1a, p. 206, New York, N.Y., McGraw-Hill, Inc. (September 1964).

Epon 828 is a liquid bisphenol A-diglycidyl ether resin marketed by Shell Chemical Company and described by: 4 max. Gardener color, 100 to 160 poises viscosity at 25° C., and 185 to 192 epoxy equivalent weight. Modern Plastics Encyclopedia, 1965, vol. 42, No. 1a, p. 206, New York, N.Y., McGraw-Hill, Inc. (September 1964). Also see Lee and Neville, Epoxy Resins, p. 20, New York, N.Y., McGraw-Hill, Inc. (1957).

DER 331 is a liquid bisphenol A-diglycidyl ether resin marketed by the Dow Chemical Company and described by: 5 max. Gardener color, 11,000 to 16,000 centipoises viscosity at 25° C., and 187 to 193 epoxy equivalent weight. Lee and Neville, Epoxy Resins, p. 19, New York, N.Y., McGraw-Hill, Inc. (1957).

ERL 2772 is a liquid bisphenol A-diglycidyl ether resin marketed by Union Carbide Plastics Division and described by: 7,000 to 9,000 centipoises viscosity at 25° C. and 175 to 185 epoxy equivalent weight. Also see Example 1 of Howard L. Bender et al., U.S. Pat. No. 2,506,486, issued May 2, 1950, "Thermosetting Resin From a Diphenol and a Diglycidyl Ether of a Diphenol."

Unox 201 is 3,4-epoxy-6-methylcyclohexylmethyl-3,4-epoxy - 6 - methylcyclohexanecarboxylate marketed by Union Carbide Chemicals Co. and is described by: 280.35 molecular weight, 1.121 specific gravity at 20/20° C., 215° C. boiling point at 5 mm. Hg, 1810 centipoises viscosity at 25° C. " 'UNOX' Epoxide 201 Formulations," Union Carbide Chemicals Company, Bulletin F–40413B (June 1960), New York, N.Y., Union Carbide Corporation. Also see Benjamin Phillips et al., U.S. Pat. No. 2,890,209, issued June 9, 1959, "Polymers of 3,4-Epoxycyclohexylmethyl - 3,4 - Epoxycyclohexanecarboxylates," Example 5.

Araldite 6004 is a liquid bisphenol A-diglycidyl ether resin marketed by Ciba Products Company and described by: 185 epoxy equivalent weight, and 5,000 to 6,000 centipoises of viscosity at 25° C. Also see Edward C. Shokal, U.S. Pat. No. 2,633,458, issued Mar. 31, 1953, "Sulphur-Containing Resinous Products From Polyepoxides," column 5, lines 14 to 36.

(A) PREPARATION AND USAGE OF $PF_5$ ADDUCTS
PROCEDURE FOR MAKING $PF_5$ ADDUCTS

The amine is dissolved in benzene or some other suitable solvent, e.g. petroleum ether or diethyl ether, to form a solution containing from 20 to 60% of the amine. The solution is then cooled to at least 20° C. and preferably to about 0° C. or lower. Gaseous $PF_5$ is then bubbled into the solution which must be stirred well and must be kept cool, the temperature preferably not exceeding 0° C.

The white or tan product begins to precipitate a short time after the injection of $PF_5$ is begun. $PF_5$ is bubbled into the solution until the pH drops to about 6 or until $PF_5$ is no longer being absorbed in significant amount.

The product is then filtered off, washed with cold benzene and/or ether, and dried. Some of the adducts are deliquescent and must be dried in the absence of atmospheric moisture.

Typically, the adducts are white-to-tan, crystalline materials.

EXAMPLE OF PREPARATION OF A $PF_5$ ADDUCT 100 g. of cyclohexylamine and 105 g. of petroleum ether were placed in a 500 ml. Erlenmeyer flask and the resulting solution was cooled to 0° C. $PF_5$ was then bubbled into the solution until it became rather thick and pasty, and $PF_5$ was no longer being absorbed with cold petroleum ether, and was then dried.

The filtrate still smelled and was treated with more $PF_5$ until the solution pH dropped to a value below 6. The solids were filtered off, washed with cold petroleum ether, and combined with those previously obtained.

USAGE OF $PF_5$ ADDUCTS

Example 1

Bisphenol A-diglycidyl ether (known as Epon 826, ERL 2772, DER 331, and by other names in the trade), 7.6 g., and 0.37 g. of n-butylamine-$PF_5$ are heated together in a small aluminum dish on a hotplate to about 250° C., with stirring. The system gels in about 3 minutes, and darkens to a ruby brown color in 5 minutes. The cooled product is hard, brittle, and has a Shore A hardness of 99 plus.

Example 2

Epon 826, 3.2 g., and 0.3 g. of laurylamine-$PF_5$ are heated in an aluminum dish on a hotplate at about 250° C., with stirring. The system dissolves, gels, and darkens in 1 minute to form a cured, insoluble product.

Example 3

Epon 826, 6.2 g., and 0.3 g. of aniline-$PF_5$ are heated with stirring at 130° C. in a small glass bottle. A clear orange solution results in 2 minutes and gels in 3 minutes. In 7 minutes the product is a hard, dark brown, gel which has a Shore A hardness of about 99 on cooling.

Example 4

Unox 201, 8.68 g., and 0.34 g. of isopropylamine-$PF_5$ are heated with stirring in a small aluminum dish on a hotplate to about 250° C. The complex dissolves in 30 seconds and gels with a very vigorous exotherm in 1 minute. The product is hard, brittle, and orange when cold.

Example 5

Glycerol polyglycidyl ether having about 2.2 equivalents of epoxy groups per mol (known as Epon 812), 11.08 g., and 0.45 g. of isopropylamine-$PF_5$ are heated with stirring in a small aluminum dish on a hotplate to about 250° C. The mixture gels in 10 minutes to a dark, clear gel.

Example 6

Ethylamine-$PF_5$, 0.35 g., and 7.2 g. of Epon 826 are heated with stirring in a small glass bottle at 132° C. The mixture has gelled in 24 hours. After 27 hours, the temperature is increased to 160° C. After an additional 6 hours at 160° C., the mixture has cured to a dark amber, smooth-surfaced, resin which has a Shore A hardness of greater than 99 at room temperature.

Example 7

Isopropylamine-$PF_5$, 0.37 g., and 7.1 g. of Epon 826 are heated with stirring in a small glass bottle at 132° C. The mixture has gelled in 20 hours. After 24 hours, the temperature is increased at 160° C. After an additional 6 hours at 160° C., the mixture has cured to a medium amber, smooth-surfaced, resin which has a Shore A hardness of greater than 99 at room temperature.

Example 8

Benzylamine-$PF_5$, 0.33 g., and 7.1 g. of Epon 826 are heated with stirring in a small glass bottle at 132° C. The mixture has become homogeneous in 20 minutes and has gelled in 2 hours. After an 8 hour cure, the mixture has set to a pale yellow orange, smooth-surfaced, resin having a Shore A hardness of about 99.

Example 9

Isopropylamine-$PF_5$, 0.36 g., and 7.2 g. of Epon 826 are heated with stirring in a small glass bottle at 162° C. The mixture become homogeneous after 5 minutes and gels in about 2½ hrs. After an 18 hour cure, the mixture has become a medium amber, smooth-surfaced, hard resin, having a Shore A hardness of greater than 99 when cold.

Example 10

Laurylamine-$PF_5$, 0.36 g., and 7.4 g. of Epon 826 are heated with stirring in a small glass bottle at 162° C. The mixture becomes substantially homogeneous and gels in about 2½ hours. After an 18 hour cure, the mixture has become a medium dark, amber, smooth-surfaced resin having a Shore A hardness of greater than 99 when cold.

Example 11

Ethylamine-$PF_5$, 0.35 g. and 7.2 g. of Epon 826 are heated with stirring in a small glass bottle at 162° C. The mixture becomes homogeneous in 5 minutes and cures to a medium-dark amber, smooth-surfaced resin in 18 hours. The resin has a Shore A hardness of greater than 99 when cold.

Example 12

Isopropylamine-$PF_5$, 0.32 g. and 7.5 g. of Epon 826 are heated with stirring in a small glass bottle at 180° C. The mixture becomes homogeneous in less than 10 minutes and gels in less than 1 hour. After a 9 hour cure the mixture has gelled to a dark amber, smooth-surfaced, resin having a Shore A hardness of greater than 99 when cold.

Example 13

A mixture of one gram of monoethanolamine-$PF_5$ adduct and 20 g. of bisphenol A-diglycidyl ether (Epon 828) was heated for 12½ hours at 130° C., whereupon it cured to a light yellow, fairly hard plastic.

After an additional 5 hours of heating at 130° C., the plastic was hard, brittle and brown in color.

The following examples illustrate the latency characteristics of the new curing agents.

Example 14 n-Butylamine-$PF_5$, 0.71 g. is dissolved in 14.0 g. of Epon 826 at 100° C. and allowed to cool. After 20 months the mixture has increased in viscosity from an initial 70,000 centipoises to about 100,000 centipoises, and still cures readily to a hard resin when heated to about 200° C. on a hotplate for 10 minutes.

Example 15

Ethylamine-$PF_5$, 0.4 g. is dissolved in 10.6 g. of Epon 826 by heating at 82° C. and is allowed to cool. There is only a small increase in viscosity on standing for 2 months at room conditions.

Example 16

Isopropylamine-$PF_5$, 0.35 g. is dissolved in 9.0 g. of Epon 826 by heating at 82° C. and is allowed to cool. There is only a small increase in viscosity on standing for 2 months at room conditions.

Example 17

Benzylamine-$PF_5$, 0.45 g. is dissolved in 10.1 g. of Epon 826 by heating at 82° C. and is allowed to cool. There is only a small increase in viscosity on standing for 2 months at room conditions.

Example 18

A mixture of 21.5 g. of bisphenol A-diglycidyl ether (Epon 828) and 1.1 g. of monoallylamine-$PF_5$ adduct was heated for 19 hours at 130° C. Some thickening and a small amount of gel formation was observed, but the mixture did not cure. It was then heated for 5½ hours at 160° C. A good cure was obtained. The cured resin was light yellow in color.

(B) PREPARATION AND USAGE OF $AsF_5$ ADDUCTS GENERAL METHOD OF PREPARING AMINE-$AsF_5$ ADDUCTS

Teflon equipment must be used throughout this preparation.

(1) An amine-$SO_2$ adduct is prepared by dissolving the amine in diethylether and adding the resulting solution slowly, with constant stirring, to an excess of liquid $SO_2$. The reaction is an extremely vigorous one. The precipitate which forms is the desired intermediate.

(2) The mixture is allowed to evaporate to dryness. Then a large excess of liquid $SO_2$ is added to produce a rather dilute slurry. Arsenic pentafluoride is bubbled into this slurry until all of the solids have dissolved.

(3) The reaction mixture is filtered through a fluted filter paper and is allowed to evaporate to dryness at room temperature. The residue is the desired amine-$AsF_5$ adduct.

Example 1: Preparation of isopropylamine-$AsF_5$ adduct 10 ml. (6.94 grams; 0.117 mole) of isopropylamine was dissolved in 90 ml. of diethyl ether, and the resulting solution was added slowly to an excess (ca. 100 ml.) of liquid sulfur dioxide in a 250 ml. Teflon beaker. The reaction was extremely vigorous. A precipitate of isopropylamine-sulfur dioxide adduct was formed.

Afted the reaction was complete, liquid $SO_2$ was added to replace that lost by evaporation. $AsF_5$ was then bubbled through the slurry of i-$C_3H_7NH_2$—$SO_2$ until the precipitate dissolved. Teflon equipment was used throughout.

The solution was then filtered and the $SO_2$ was allowed to evaporate while standing at room temperature. A liquid residue with a slight odor of $SO_2$ was left behind. This was dried under a heat lamp in a stream of dry air for about thirty minutes to remove residual sulfur dioxide.

The yield was 16 grams, 69.6% of the theoretical yield based on the weight of isopropylamine used.

USES OF $AsF_5$ ADDUCTS

Example 2

One gram of laurylamine-$AsF_5$ adduct and 20 grams of Epon 828 (a diglycidyl ether of bisphenol A with an epoxy equivalent weight of about 190) were weighed into an aluminum weighing dish and thoroughly mixed. The catalyst dispersed, but did no dissolve completely.

The mixture was then placed in an oven at a temperature of about 145° C. The mixture gelled in 87 minutes, forming a rather cheesy gel which was soft and flexible at room temperature. This gel was then post-cured at the same temperature for 171 minutes, whereupon it was converted into a hard plastic, light yellow in color and having fair impact resistance.

Example 3

Into an aluminum weighing dish were weighed 1 gram of laurylamine-$AsF_5$ adduct, 2.04 g. of methoxyethanol, and 20 g. of Araldite 6004 (a diglycidyl ether of bisphenol A with an epoxy equivalent weight of about 185). The mixture was stirred thoroughly, and was then placed in an oven at 120° C. The mixture thickened slowly and gelled after 168 minutes. The gel was a light orange color.

Example 4

One gram of isopropylamine $AsF_5$ adduct and 20.0 g. of Epon 828 (an epoxy resin with an epoxy equivalent weight of about 190) were weighed into a small aluminum dish, and were then mixed thoroughly. The mixture was then placed in an air oven at a temperature of 138° C. The mixture thickened slowly and gelled after 200 minutes in the oven. The gel was heated for an hour at 138° C. After this it was a fairly dark, transparent brownish-orange gel, soft when hot, but hard and rigid at room temperature.

Example 5

Epon 826, 6.0 g., and 0.3 g. of laurylamine-$AsF_5$ are heated with stirring at 135° C. in a small glass bottle. A clear solution results in 7 minutes, and a good, hard, dark orange gel is formed in 1 hour and 45 minutes.

Example 6

Laurylamine-$AsF_5$, 0.55 g. is dissolved in 4.9 g. of Epon 826 by heating at 100° C. and allowed to cool. After 15 months the mixture has formed a skin on the surface but still is a viscous fluid in the body of the mixture.

(C) PREPARATION AND USAGE OF $SbF_5$ ADDUCTS GENERAL METHOD OF PREPARING AMINE-$SbF_5$ ADDUCTS (1) Make an $SO_2$ adduct of the amine by adding the amine slowly, with constant stirring to an excess of liquid sulfur dioxide cooled in a Dry Ice bath. The adduct is insoluble in $SO_2$ and precipitates.

(2) Make an $SO_2$ adduct of antimony pentafluoride by adding $SbF_5$ slowly to an excess of liquid $SO_2$ cooled in a Dry Ice bath. Part of the $SbF_5$-$SO_2$ complex percipitates from solution.

(3) The slurry of $SbF_5$-$SO_2$ adduct (from step 2) in liquid $SO_2$ is added slowly to the slurry of amine-$SO_2$ adduct (from step 1) in liquid $SO_2$. The reaction is rather violent and some darkening of the reaction mixture usually occurs.

(4) The $SO_2$ is allowed to evaporate at room temperature (usually overnight). The amine-$SbF_5$ adduct is left behind.

Example 1: Preparation of ethylamine-antimony pentafluoride adduct

About 160 g. (3.58 moles) of ethylamine was dropped slowly with constant stirring into 200 ml. of liquid $SO_2$, cooled by a Dry Ice-trichloroethylene bath (the reaction was strongly exothermic, and some amine was lost by evaporation).

Next, a solution of 447 g. (2.06 moles) of $SbF_5$ in 300 ml. of liquid $SO_2$ was prepared by adding the $SbF_5$ to the $SO_2$, cooled in a Dry Ice-trichloroethylene bath. A solid, persumably $SbF_5$-$SO_2$ precipitated.

The $SbF_5$-$SO_2$ slurry was then added slowly to the ethylamine-$SO_2$ slurry, both slurries being cooled to −20° C. or lower. The addition was made slowly with stirring. The reaction was rather violent, and some darkening of the reaction mixture was observed towards the end of the addition.

The reaction mixture was then allowed to stand overnight at room temperature. A mass of light tan crystals was obtained. These were washed with benzene, sucked dry on the filter, and dried in air. The melting range was 207–218° C. (with decomposition). $C_2H_5NH_2$-$SbF_5$.— Percent F calculated 36.28. Found 37.23. Percent N calculated 5.35. Found 5.15.

USES OF SbF₅ ADDUCTS

Example 2

One gram of n-butylamine-SbF$_5$ adduct, 0.5 gram of methoxyethanol and 20 g. of Epon 828 (an epoxy resin with an epoxy equivalent weight of about 190) were weighed into an aluminum weighing dish and mixed thoroughly. The mixture was placed in an oven at about 160° C. It gelled in less than 14 minutes with the evolution of considerable heat.

A second sample of the same mixture was placed in an oven at about 128° C. The mixture thickened solwly and formed a soft gel after 319 minutes.

Example 3

One gram of monoethylamine-SbF$_5$ adduct, 0.265 g. of methoxyethanol, and 20.330 g. of Epon 828 (an epoxy resin with an approximate epoxy equivalent weight of 190) were weighed into an aluminum weighing dish and mixed thoroughly. The mixture was placed in an oven at 140° C., and gelled in something less than 21 minutes. The resulting gel was hard and dark in color.

Example 4

One gram of monoethylamine-SbF$_5$ adduct, 0.2 g. of methoxyethanol, and 20 g. of Epon 828 (an epoxy resin with an approximate epoxy equivalent weight of 190) were weighed into an aluminum weighing dish, and were mixed thoroughly. The mixture was then placed in an oven at 139° C. A hard, clear gel formed in about 10 minutes.

Example 5

One gram of benzylamine-SbF$_5$ adduct, 0.250 g. of methoxyethanol, and 20 g. of Epon 828 (an epoxy resin with an approximate epoxy equivalent weight of 190) were placed in an aluminum weighing dish and were thoroughly mixed. The mixture was placed in an oven at 139° C. A hard, clear gel formed in about 27 minutes.

Example 6

Epon 826, 7.7 g., and 0.4 g. of laurylamine-SbF$_5$ are heated with stirring at 135° C. in a small glass bottle. The mixture gels in 20 minutes to form an inhomogeneous gel, and a hard, lumpy gel is formed in 1 hour and 40 minutes.

Having thus described our invention we claim:

1. The latently curable composition consisting of:
   (A) the reaction product of a mixture of (1) a Lewis acid selected from the group consisting of AsF$_5$ and SbF$_5$ and (2) a primary acyclic aliphatic amine having from 1 to 18 carbon atoms attached to the amine nitrogen; and
   (B) a polyepoxide with the epoxy groups thereof being selected from the group consisting of glycidyl ether radicals and the 1,2-epoxy-substituted cycloaliphatic radicals.

2. The latently curable composition consisting of:
   (A) the reaction product of a mixture of (1) a Lewis acid selected from the group consisting of PF$_5$, AsF$_5$ and SbF$_5$ and (2) a primary acyclic aliphatic amine having from 1 to 18 carbon atoms attached to the amine nitrogen; and
   (B) a polyepoxide with the epoxy groups thereof being selected from the group consisting of glycidyl ether radicals and the 1,2-epoxy-substituted cycloaliphatic radicals.

References Cited

UNITED STATES PATENTS

| | | | |
|---|---|---|---|
| 2,717,885 | 9/1955 | Greenlee | 260—47EP |
| 2,856,370 | 10/1958 | Muetterties | 260—2EP |
| 3,441,520 | 4/1969 | Bosniack et al. | 260—2EP |

OTHER REFERENCES

J. of Inorg. Nuclear Chem., Muetterties et al., 1960, vol. 16 (pp. 52–59).

WILLIAM H. SHORT, Primary Examiner

T. E. PERTILLA, Assistant Examiner

U.S. Cl. X.R.

117—161; 161—184; 252—429; 260—2, 59